United States Patent
Leister (10) Patent No.: US 8,259,243 B2
(45) Date of Patent: Sep. 4, 2012

(54) CONTROLLABLE DEVICE FOR PHASE MODULATION

(75) Inventor: Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 504 days.

(21) Appl. No.: 12/466,433

(22) Filed: May 15, 2009

(65) Prior Publication Data
US 2009/0284671 A1  Nov. 19, 2009

(30) Foreign Application Priority Data
May 16, 2008 (DE) .................... 10 2008 001 827

(51) Int. Cl.
*G02F 1/133* (2006.01)
(52) U.S. Cl. .......................... 349/18; 349/171
(58) Field of Classification Search ............ None
See application file for complete search history.

(56) References Cited

U.S. PATENT DOCUMENTS
7,145,616 B2 * 12/2006 Mochizuki .................... 349/114
2007/0003709 A1  1/2007 Mochizuki et al.

OTHER PUBLICATIONS
Mochizuki, Journal of the SID, 14/6, pp. 529-536 (2006).
Pancharatnam, Proc. Ind. Acad. Sci. 41, pp. 130-144 (Parts I and II) (1955).
Love et al., Opt. Communications, 110, pp. 475-478 (1994).

* cited by examiner

*Primary Examiner* — Mike Stahl
(74) *Attorney, Agent, or Firm* — Saul Ewing LLP (57) ABSTRACT

A controllable device for phase modulation of coherent light with modulator cells comprising liquid crystal molecules is provided which realizes a large number of phase steps per modulator cell and whose switching delay is shorter than 1 ms. The device can include a spatial light modulator with a modulator matrix having regularly arranged controllable LC modulator cells, a light source which illuminates the modulator matrix, and control means for controlling the phase modulation in the LC modulator cells. The modulator matrix can be configured to comprise a controllable λ/2 plate disposed between two non-controllable λ/4 plates; the controllable LC modulator cells can be PSS liquid crystal; each LC modulator cell is controllable locally with a positive or negative voltage value, depending on the actual phase values to be written; and the control means generate a globally constant phase offset for the phase values to be written in every other frame.

16 Claims, 4 Drawing Sheets

CONTROLLABLE DEVICE FOR PHASE MODULATION

CROSS-REFERENCE TO RELATED APPLICATIONS

This application is based on and claims priority to German Application No. DE 10 2008 001 827.9, filed May 16, 2008, the entire contents of which are hereby incorporated by reference.

BACKGROUND OF THE INVENTION

The present invention relates to a device for phase modulation of coherent light with a spatial light modulator which comprises a modulator matrix with a regular arrangement of controllable LC modulator cells, with at least one light source which illuminates the modulator matrix, and with a control unit which controls the phase modulation in the LC modulator cells. A three-dimensional representation of images can be realised with this device if it is used as a display device.

The field of application of this invention includes coherent-optical applications which comprise for modulating coherent light a liquid crystal (LC) device which is used to control the phase of the light in phase steps, whose number typically ranges between more than fifty and several hundreds, in a modulation element of the LC device. The LC device can be used for three-dimensional, preferably holographic image representation.

In the field of coherent-optical applications there is a demand for a very fast switching spatial light modulator (SLM), with switching delays in a range of less than 1 ms, which can preferably be used as a phase-modulating spatial light modulator. Liquid crystal (LC) modulators (LC SLM) can be used for this, which have the advantage over other modulator types that they can be manufactured inexpensively with conventional production technologies.

The switching delay of the LC molecules in a LC SLM depends among other factors on the LC type (nematic, smectic, . . . ) and on the arrangement of the LC molecules in a modulator cell of the modulator matrix of the LC SLM.

The publication [1], A. Mochizuki, Journal of the SID 14 (2006) pp. 529-536, discloses the idea of using a polarisation shielded smectic liquid-crystal-type spatial light modulator (PSS LC SLM) as an amplitude-modulating light modulator. Switching delays of less than 500 μs are being described for this type of modulator. The long axes of the LC molecules are described to generally move, when an electric field is applied, along the shell of a cone, but where the cone is compressed. This compression deforms the base of the cone such that it turns from a circle into a narrow ellipse. In the present case, the major axis of the ellipse lies in the screen plane, and the LC molecules move mainly in the screen plane.

Document US 2007/0003709 also describes the design of a PSS LCD used as an amplitude-modulating light modulator.

Further, it is known that for controlling SLM with nematic LC the sign of the voltage is altered in every other frame, which is known as 'frame inversion'. This is done to prevent both the occurrence of undesired chemical processes, which would otherwise take place when a DC field is applied, and image sticking. Frame inversion is realised in one embodiment such that in a first frame all modulator cells of the modulator matrix are controlled with a positive voltage and in a second frame all modulator cells of the modulator matrix are controlled with a negative voltage.

Alternatively, the sign of the voltage can be altered dot-wise ('dot inversion') or line-wise ('line inversion') in order to prevent flickering. With line inversion, in a first frame even columns of the modulator matrix are controlled with a positive voltage and odd columns are controlled with a negative voltage, for example. In a second frame, the columns are controlled vice versa. With dot inversion, the modulator matrix shows a chessboard-like pattern of positive and negative control voltages.

In conventional nematic LC SLM, the orientation of the LC molecules depends only on the absolute value of the applied voltage, not on the sign. The orientation of these LC molecules does thus not change when frame inversion is employed.

In contrast, publication [1] discloses that in LC SLM of the PSS liquid crystal type (PSS LC) there are two different, mirror-symmetrical orientations of the LC molecules when the sign of the voltage which is applied to the LC layer changes. However, these two orientations effect the same amplitude of the modulated light, so that a PSS LC which is used as an amplitude-modulating light modulator can be controlled using frame inversion, line inversion or dot inversion methods, just like a conventional modulator with nematic LC.

Further, document [2], S. Pancharatnam, Proc. Ind. Acad. Sci. 41 (1955) pp. 130 (Parts I and II), discloses an arrangement of a λ/2 plate which is disposed between two λ/4 plates, and which is used as a phase-modulating light modulator, as the optical axis of the λ/2 plate is controlled in different angles in relation to the λ/4 plates. Further, [2] suggests to realise achromatic λ/4 plates as a combination of multiple birefringent layers, and to obtain an achromatic circular polariser by combining two λ/2 plates and one λ/4 plate, which are arranged under certain angles of their optical axes.

Such a configuration is also described in document [3], G. Love, R. Bandari, Opt. Commun. 110, (1994), pp. 475-478, for a ferro-electric LC SLM, which switches very fast, but which has the disadvantage that only two phase conditions can be realised per modulator cell. In other words, it is a binary LC SLM.

A similar configuration is also possible for an in-plane switching (IPS) LC SLM, which is used as a controllable λ/2 plate between two fix, non-controllable λ/4 plates. A continuous phase modulation between 0 and 2π is possible by turning the LC molecules by an angle ranging between 0 and 90 degrees in the display plane by applying an electric field.

In contrast to a commonly used dual-domain IPS LC SLM, where a modulator cell is divided into two halves in order to realise an enlarged viewing angle range, a single-domain structure with a homogeneous modulator cell would be necessary to get a phase-modulating light modulator. However, today's IPS LC SLM do not achieve the desired switching delays of less than 1 millisecond. Simply modifying an IPS LC SLM would therefore not be adequate to get a fast switching phase-modulating light modulator.

SUMMARY OF THE INVENTION

It is therefore an object of the present invention to provide a controllable device for phase modulation of coherent light based on liquid crystal molecules (LC molecules) which can realise at least 50 phase steps per modulator cell and which shows switching delay of less than 1 ms, while circumventing disadvantages of prior art solutions. Physical modifications of known, commercially available LC SLM should preferably be as little as possible to achieve the aforementioned goals.

The object can be solved by a device for phase modulation of coherent light with a spatial light modulator comprising a modulator matrix with a regular arrangement of controllable LC modulator cells, with at least one light source which illuminates the modulator matrix, and with a control unit that can control the phase modulation in the LC modulator cells, to realise a three-dimensional image representation in a display device comprising the modulation device. The device according to this invention can be further configured such that The controllable LC modulator cells have a layer with the functionality of a controllable λ/2 plate with LC molecules of the type and arrangement of PSS liquid crystal cells, said layer being disposed between two layers with the functionality of non-controllable λ/4 plates, Each LC modulator cell can be controlled locally by the control unit with an individual positive or negative voltage value, depending on the positive or negative sign of a phase value to be written, The control unit can be programmed such to generate a globally constant phase offset for the phase values to be written to the LC modulator cells, and The globally constant phase offset can be generated in every other frame.

These features of this invention characterise a controllable device for phase modulation and will be explained in detail below.

Because the LC molecules mainly move in the plane of the modulator matrix, as mentioned in the description of the prior art, a similar behaviour must be expected as regards phase modulation as in an IPS LC SLM, but with the advantage that shorter switching delays are achieved.

An orientation of the LC molecules out of the plane of the modulator matrix would cause changes in amplitude. These can be accepted if the effect of the amplitude changes is small. The LC material can be used as a controllable λ/2 plate because the birefringence of the LC material and the layer thickness are matched accordingly.

In order to be able to use PSS-LC-type modulator cells in the desired way in phase-modulating light modulators, further essential features are required as regards controlling functions:

A change in the sign of the applied voltage effects a different orientation of the LC molecules in PSS LC cells, as described above. This change in molecule orientation corresponds with a rotation of the optical axis of the λ/2 plate. The molecule orientation and the optical axis are turned clockwise in order to realise positive voltages, and counter-clockwise to realise negative voltages.

In contrast to an amplitude-modulating light modulator, in a phase-modulating light modulator of the above-described configuration the phase conditions change depending on the sign of the applied voltage. In the λ/2 plate disposed between two λ/4 plates, turning the optical axis of the λ/2 plate clockwise corresponds to a phase shift with positive sign, turning it counter-clockwise corresponds to a phase shift with negative sign.

Now, if a modulator cell is controlled e.g. by a voltage $U_0$ with positive sign, and if this voltage corresponds to a rotation angle of the optical axis $\theta_0$ and a phase $+\phi_0$, then if the same modulator cell is controlled with the voltage $-U_0$ with the same absolute value but negative sign the rotation angle of the optical axis is $-\theta_0$ and the phase is $-\phi_0$, i.e. with the same absolute value but opposite sign.

For phase modulation in a large modulation range of phase values it is therefore necessary to modify the control method such that the sign of the voltage can be chosen individually for each modulator cell, depending on the actual phase value to be written. This doubles the phase range which can be realised compared with the case where only control voltages with one sign can be used.

In order to avoid disadvantages which would be caused by long application of a DC voltage to a modulator cell, an frame inversion of the modulator matrix of the inventive device is further necessary.

Frame inversion according to one of the given methods according to the prior art such that all modulator cells of the modulator matrix are controlled globally and simultaneously with either positive or negative voltage, or that line or dot inversion is applied, cannot be used though. This would conflict with the individual control of individual modulator cells with positive or negative voltages according to the phase value to be written.

Individual control of the modulator cells with individual positive or negative voltage values where the sign of the voltages of each modulator cell changes in every other frame would also be disadvantageous. There would be sign-changed phases in the individual modulator cells in every other frame. Now, if a hologram is represented in the modulator matrix, a global inversion of the sign of the phase values would result in a mirror-symmetrically changed reconstruction. To avoid this, such an inversion can be used in a device for phase modulation where only every other frame is used for 3D representation. The control of a light source can for example be synchronised with the modulator matrix such that the light source is switched off during every other frame. The device has the disadvantage of a lower light intensity, because the light source must be off for about half the time.

Now, a further, preferred embodiment is proposed which circumvents this disadvantage: The phase values are here adapted in every other frame. This is done for example in that the same information is written with the help of control signals generated by the control unit, but while the image content is the same, different signs of the voltage are generated simultaneously for individual modulator cells in every other frame.

The condition that the same information is written while generating different signs of the control voltage can be fulfilled as follows: A global phase offset of the phase values to be written is permitted for the entire modulator matrix. This means that a constant phase value is added simultaneously for each modulator cell. In most coherent applications, e.g. for hologram reconstructions, it is only the relative phase between individual modulator cells of the PSS LC SLM that matters, not the absolute phase. This is why the phase offset can be employed advantageously here.

Frame inversion can thus be replaced equivalently as follows: In every other frame the phase values to be written to the LC SLM are given a globally constant phase offset (modulo $2\pi$), where the amount of the offset depends on the modulation range of the SLM. The preferred phase offset is $\pi$ for a modulator with a modulation range of $2\pi$.

This will now be explained with the help of an example: A phase-modulating light modulator has a relative phase of 0 at a voltage of 0; it shows a phase shift of $+\pi$ at a maximum positive control voltage $U_{max}$. Consequently, at the negative control voltage $-U_{max}$ the phase shift is $-\pi$, relative to the voltage 0. The phase-modulating light modulator thus has a modulation range of $2\pi$, namely the range $[-\pi \ldots +\pi]$. The sub-range $[-\pi \ldots 0]$ corresponds with negative voltages, whereas the sub-range $[0 \ldots +\pi]$ corresponds with positive voltages.

In the first frame, for example, a linear rising phase pattern is written to four adjacent modulator cells with the phase values $\phi 1=-\pi/2$, $\phi 2=-\pi/4$, $\phi 3=0$, $\phi 4=\pi/4$. The phase pattern is linear rising because the difference between values written to adjacent cells is always $\pi/4$. As the first two phase values lie in the sub-range $[-\pi \ldots 0]$, these two modulator cells are controlled with negative voltages. The third cell would be controlled with the voltage 0 and the fourth with a positive voltage.

In a second frame this phase pattern is written with a phase offset of π. The phase values are now φ1'=φ/2, φ2'=3 φ/4, φ3'=φ, φ4'=5 φ/4. Only the phase value modulo 2π is relevant for the representation of a complex number. The sub-range [−π . . . 0] is thus equivalent to the shifted range [π . . . 2π]. The phase value 5π/4 thus corresponds with the phase value 2π−5π/4=−3π/4.

The first three phase values now lie in the range [0 . . . π], and the corresponding modulator cells are controlled with positive voltages; the fourth value lies in the range [−π . . . 0], and the corresponding modulator cell is controlled with a negative voltage.

The sign of the control voltage thus changes for all modulator cells but the third one, which forms an exception because its control voltage is zero in one frame. However, it is still the same phase pattern, namely the linear rising phase, that is written to the modulator cells. This means that the difference between the phase values of adjacent cells also remains π/4 in the second frame. It is thus achieved that the sign of the voltage is inverted in most cells in every other frame according to the phase value setting, while the relevant phase pattern which is written to the modulator matrix remains the same.

The local phase offset can be generated in the LC modulator cells while the electric field is turned off by aligning the molecule axes of the LC molecules parallel with the optical axes of the λ/4 layers.

Further, the phase value which results from a given voltage can be realised in a LC modulator cell with same absolute value but opposite sign when the voltage polarity is reversed.

The at least one light source of the controllable device is preferably designed for providing polarised light. The modulator matrix can alternatively comprise at least one entry-side polariser. The polariser can preferably be a circular polariser, which combines the functionality of a λ/4 plate and a linear polariser.

In a further embodiment of the invention, which provides for colour representation, the modulator matrix has such a configuration of the λ/4 plates and/or λ/2 plate that a phase modulation can be controlled by the control unit for at least three different colours or wavelengths. For phase modulation, the LC layer of the λ/2 plate has a thickness d which is optimised for the central one of the at least three wavelengths which are modulated.

To allow colour representations, the device for phase modulation can comprise LC modulator cells with a mix of LC materials whose dispersion changes with the wavelength, so that $\Delta n (\lambda) d \approx \lambda/2$ applies for the different wavelengths of the at least three colours.

According to another preferred embodiment, the λ/4 plates and/or the λ/2 plate show a different layer thickness d and/or orientation of their optical axes for the LC modulator cells which correspond with the different wavelengths. Further, the non-controllable λ/4 plates can be achromatic elements. The physical form of these λ/4 plates and that of the achromatic circular polarisers, into which the functionality of the λ/4 plates is integrated, can be the same as explained in the description of the prior art.

For phase modulation, the non-controllable λ/4 plates and/or the λ/2 plate can also be multi-order elements. This is the case if there is a set of wavelengths λi and a set of integer numbers mi which satisfy the equation $\Delta n(\lambda_i) d = (2m_i+1)\lambda_i/2$ for the λ/2 and/or the equation $\Delta n(\lambda_i) d = (4m_i+3)\lambda_i/2$ for the λ/4 plate for all i=1, 2, 3, . . . at least approximately.

A device for phase modulation with the physical forms described above can preferably be provided by relatively simple but effective modifications of a prior art LC SLM which boasts short switching delays.

BRIEF DESCRIPTION OF THE DRAWINGS

Now, the invention will be described in detail in conjunction with the accompanying drawings, wherein.

DETAILED DESCRIPTION OF THE INVENTION

The inventive device for phase modulation of coherent light comprises a spatial light modulator (SLM), at least one light source means for illuminating the modulator matrix of the SLM, and a control unit for controlling the phase modulation of modulator cells of the modulator matrix. The modulator cells are LC modulator cells which are arranged regularly in rows and columns and which are preferably of rectangular shape. The function of the invention can also be realised with other forms of LC modulator cells. The control unit comprises memory units and computing units which communicate with each other with the help of software and hardware elements in order to generate and exchange data in order to control the LC modulator cells with control signals for a preferably three-dimensional image representation. The device for phase modulation can for example be integrated into a holographic display device.

Figure 1:
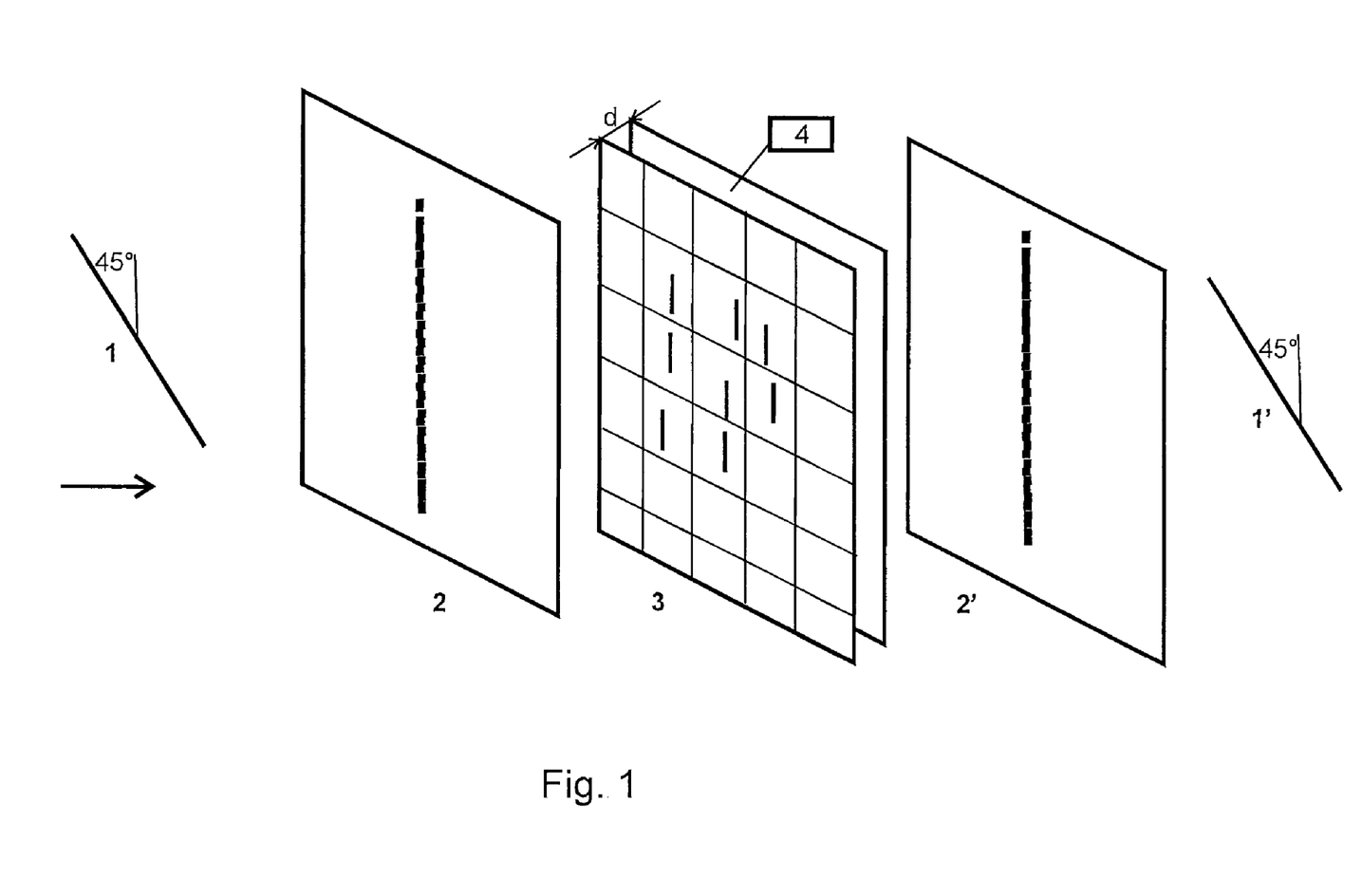
FIG. 1 is a schematic view of a LC arrangement for phase modulation according to this invention.

The design of a controllable phase-modulating device is shown schematically in FIG. 1 with its major components. A three-dimensional modulator matrix 3 with a layer thickness d forms a controllable λ/2 plate, and is disposed between two static, non-controllable layers. The two static layers have the function of non-controllable λ/4 plates 2, 2'. As regards function and properties, this is the same arrangement as described by Pancharatnam [2] in the prior art section. The λ/4 plates 2, 2' can for example be realised in the form of films.

The λ/2 plate comprises a LC layer of the PSS liquid crystal type, which can be controlled by a control unit 4, and shows a regular arrangement of modulator cells in rows and columns. An oriented LC molecule is shown exemplarily in the drawing in several modulator cells. The optical axes of the two λ/4 plates 2, 2' are parallel, they are indicated by a vertical line. The numerals 1 and 1' designate the polarisation direction of the incident light at the points of entry and exit of the modulation device.

The thickness d of the LC layer is such to provide the functionality of a λ/2 plate, it is characterised by the equation (1) $\Delta n\, d = (2m+1)\lambda/2$, where Δn describes the birefringence of the LC material used, λ is the wavelength of the used light, and m is an integer number.

The orientation of the λ/4 plates 2, 2' relative to the orientation of the birefringent LC molecules when no electric field is applied is here chosen such that the optical axes of the λ/4 plates and that of the λ/2 plate are parallel. It is generally also possible to use other mutual orientations of the optical axes.

Light 1, which is emitted by a light source means (not shown), and which is preferably linear polarised, falls on the non-controllable λ/4 plate 2 with a polarisation angle α of 45°. This λ/4 plate transforms the linear polarised light into circular polarised light. The controllable λ/2 plate, which follows in the direction of the propagating incident light, modulates the phase of the passing light depending on the actually set rotation angle of its optical axis. The shown parallel orientation of the optical axes is considered to be the relative phase 0. Controlling the λ/2 plate would result in a phase change. The second λ/4 plate 2', which follows the λ/2 plate, then generates linear polarised light 1' again with a polarisation direction which is parallel to that on the entry side.

The at least one light source can for example be a laser which preferably generates linear polarised light. The arrangement shown in FIG. 1 can also comprise at least one linear polariser which can be additionally activated.

Another possibility of generating a global phase offset is to use commercially available circular polarisers, which already combine the functions of a linear polariser and a λ/4 plate.

Prior art LC light modulators are often designed such that there are at least two substrates—commonly in the form of thin glass plates—on either side of the LC layer. One substrate typically accommodates a common electrode (basic electrode) for all modulator cells, and the other substrate accommodates an individual electrode for controlling each modulator cell. According to prior art solutions, the devices are controlled in that the common electrode is given a mean voltage different from zero, e.g. 6 V (also known as source bus voltage). The individual electrodes can then be given higher or lower variable voltage values, e.g. 9 V for one modulator cell and 3 V for another cell. The voltage values activated from outside are positive. For these electrodes, in the first case a positive voltage of +3 V (9 V−6 V) is applied, where in the second case a negative voltage of −3 V (3 V−6 V) is applied. In prior art solutions, the sign of the voltage which is applied to a modulator cell can be varied by selecting the source bus voltage accordingly. The terms 'positive voltage' and 'negative voltage' will be used in this sense below.

In contrast, the sign of the voltage is changed according to this invention in subsequent frames in order to circumvent undesired chemical processes which would be caused by the DC voltage.

In many conventional LCD, the liquid crystals of the modulator matrix only change their orientation depending on the absolute value of the voltage, but not on its sign. In these types of modulators, changing the sign does therefore not have any adverse effects on the orientation of the liquid crystal molecules.

Displays of the PSS liquid crystal type (PSS LCD) differ from conventional LCD as described in the previous paragraph in that the orientation of the molecules depends on the sign of the voltage.

Figure 2:
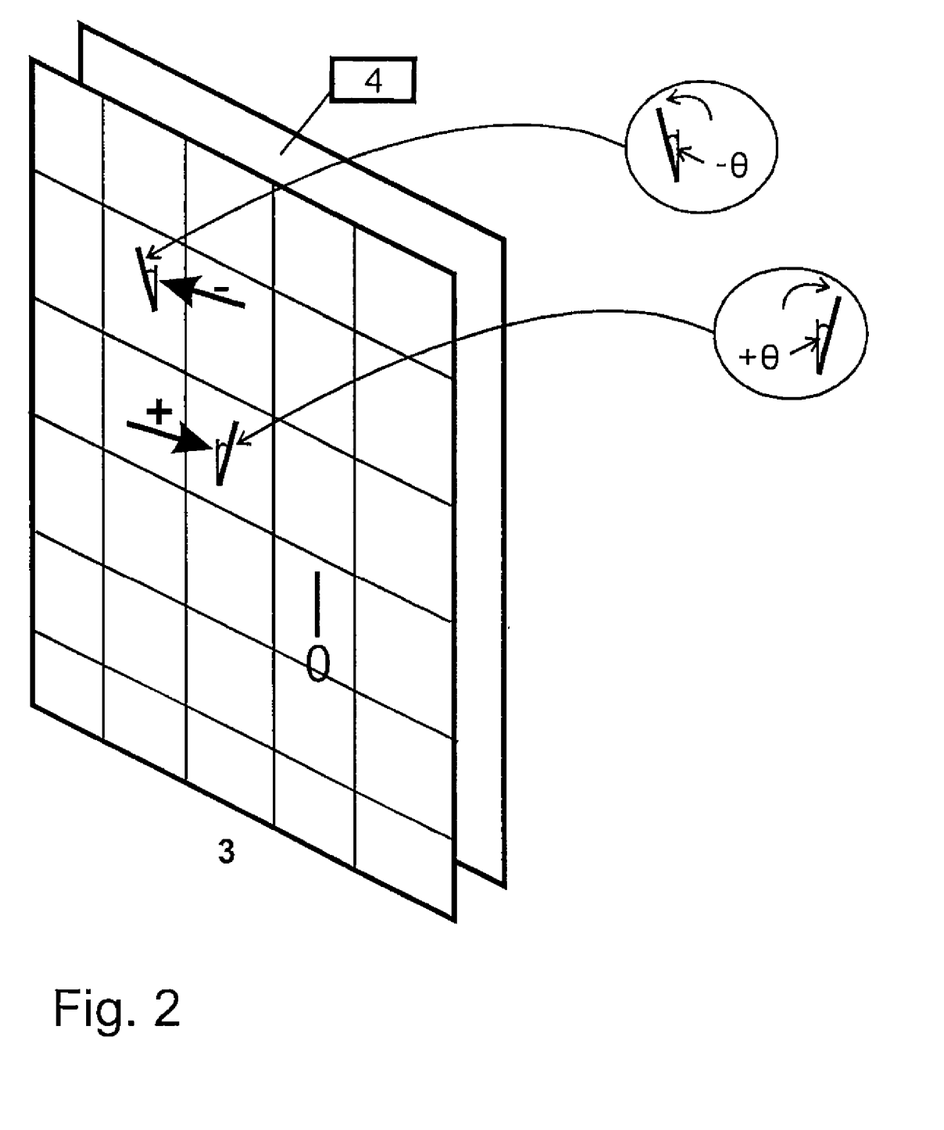
FIG. 2 is a schematic view of the preferred direction of rotation of the LC molecules depending on the applied voltage.

This is shown schematically in FIG. 2. In a section of the modulator matrix 3, which is shown in a perspective view, there are three modulator cells with one LC molecule each with its orientation when voltage is applied; arrows indicate these oriented molecules. In one modulator cell (left-hand side of the matrix) with activated negative voltage the LC molecules rotate counter-clockwise by the angle −θ. In one modulator cell (centre of the matrix) with activated positive voltage the LC molecules rotate clockwise by the angle +θ. The voltage value 0 is shown in a third modulator cell (right-hand side of the matrix) for comparison.

If a PSS LCD is used as an amplitude-modulating display, controlling the cells with different signs always causes the same amplitude. This is because the amplitude control is based on a rotation of linear polarised light. A λ/2 plate with an angle θ relative to the polarisation of the incident light turns it by 2θ. The transmittance of the amplitude-modulating light modulator with crossed polarisers is proportional to the square sine of 2θ. It is thus the same for the positive angle 2θ and for the negative angle −2θ. Consequently, in a display device or modulator matrix it is irrelevant whether the molecules rotate clockwise or counter-clockwise. If an amplitude-modulating light modulator is realised with a PSS LCD, the device can thus be controlled conventionally.

However, things are different with a PSS-LCD-type phase-modulating light modulator. Here, the sign of the phase value created by a positive voltage would differ from that created by a negative voltage.

For phase modulation, the electric control by the control unit must be adapted according to this invention such that an individual modulator cell can be controlled locally with either a positive or a negative voltage.

In order to be able to realise a phase modulation in the positive range of values of 0 . . . +φ, the control unit must control the modulator cells of the modulator matrix 3 with a positive voltage value, so that the LC molecules rotate clockwise. If the modulator cells are controlled with a negative voltage value of the same magnitude, so that the LC molecules rotate counter-clockwise, the phase will be modulated in the negative range of values of 0 . . . −φ. Due to the fact that for representing complex numbers phase values only enter modulo 2π, the negative value −φ is equivalent to 2π−φ.

Figure 3A:
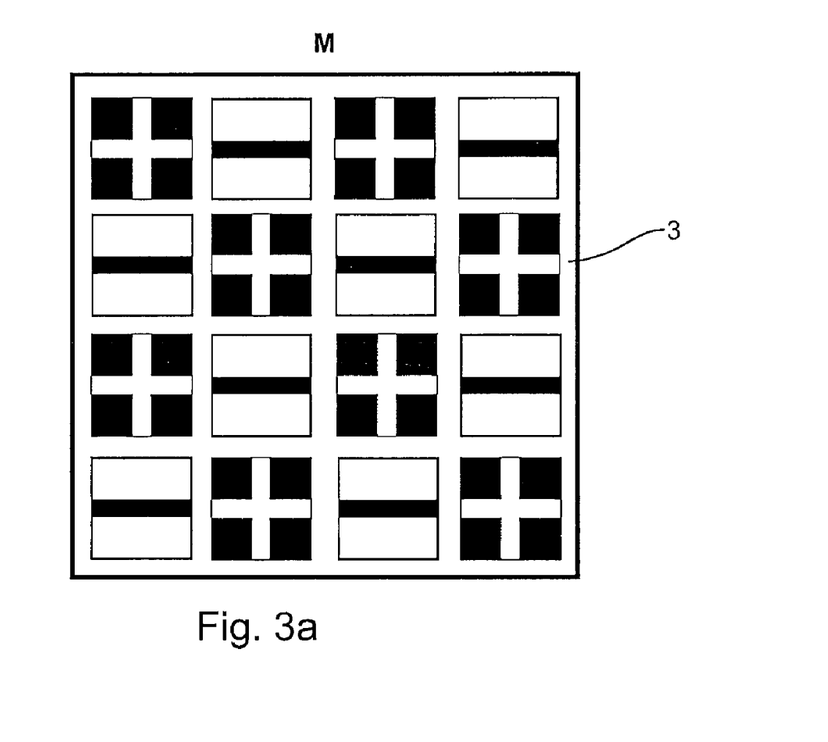
FIGS. 3a, 3b are schematic views of a modulator matrix with an inversion of the LC modulator cells in two subsequent frames according to the prior art.
Figure 3B:
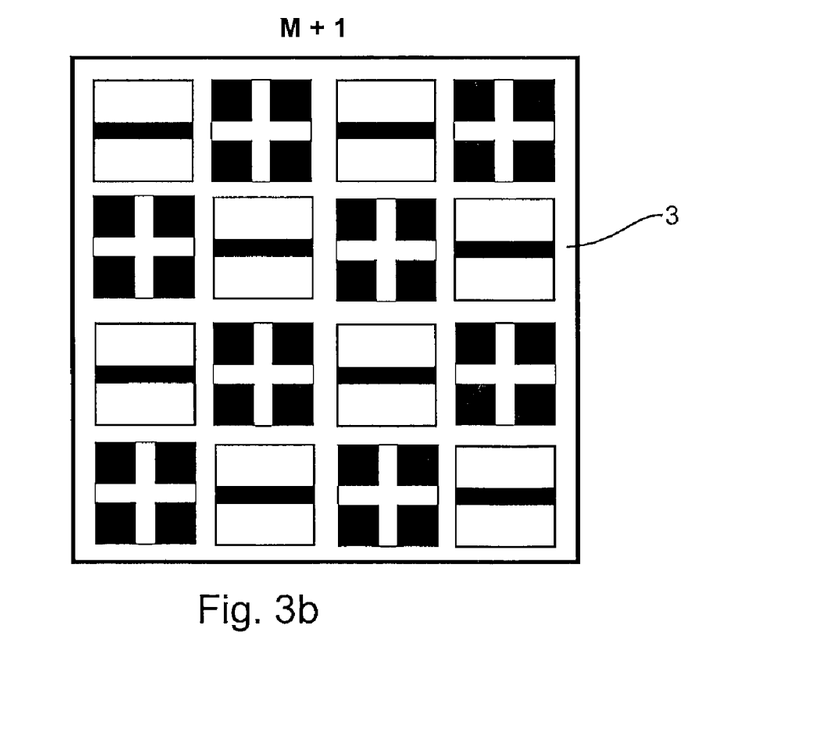

FIGS. 3a and 3b illustrate schematically a conventional control of a SLM according to the prior art, showing the principle of the pixel inversion for two subsequent frames M and M+1. The SLM comprise a modulator matrix with 4×4 modulator cells which are regularly arranged in rows and columns.

In frame M, shown in FIG. 3a, there is a regular pattern of positive and negative voltages to be realised in individual modulator cells. The absolute values of the voltages here depend on the written amplitude values, but the sign of the voltages is used independently of the content.

In the subsequent frame M+1, as shown in FIG. 3b, the individual signs of the voltages for each of the 4×4 modulator cells are inverted compared with frame M. The inversion shown here takes advantage of a chessboard-like pattern for controlling the cells. The modulator cells can also be controlled by the control unit in different patterns. For example, every other column in frame M could be controlled only with negative or only with positive voltage values. Or all modulator cells in frame M could be controlled with positive voltage values, and in frame M+1 with negative voltage values.

In a PSS LCD with a device for phase modulation according to this invention, the control means control each modulator cell individually locally with a positive or negative voltage, according to the given phase value to be written. This is shown in an embodiment of the SLM shown in FIGS. 4a and 4b.

Figure 4A:
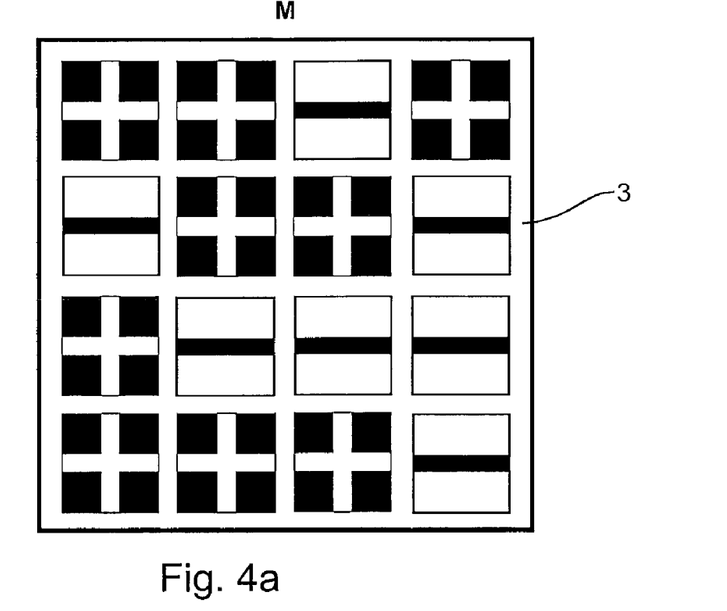
FIGS. 4a, 4b are schematic views of a modulator matrix with individually locally controlled LC modulator cells (FIG. 4a) and with the inversion of the LC modulator cells caused by a global phase offset (FIG. 4b).

A numerical example (1) shows for a SLM made up of 4×4 modulator cells for phase modulation phase values to be written between 0 and 2π for a linear phase pattern. The phase values are for example pre-computed and stored in memory units of the control unit.

| | | | |
|---|---|---|---|
| 0.7 π | 0.2 π | 1.3 π | 0.5 π |
| 1.1 π | 0.9 π | 0.8 π | 1.2 π |
| 0.5 π | 1.6 π | 1.7 π | 1.1 π |
| 1.5 π | 1.1 π | 1.4 π | 0.9 π |

FIG. 4a shows schematically the modulator cells to be controlled with positive and negative voltage values, represented by plus and minus signs in the respective cell. All modulator cells with phase values in the range [0 ... π] are controlled with a positive voltage. All phase values in the range [π ... 2π] are controlled with negative voltage values, because the range [π ... 2π] is equivalent to the range −[π ... 0] for a modulo 2π representation.

The left modulator cell in the top row with the phase 0.7π is for example controlled with a voltage $U_1$, the third modulator cell from the left in the top row with the phase 1.3π=2π−0.7π is controlled with a voltage $-U_1$, which has the same absolute value, but opposite sign.

However, the individual local control of the modulator cells with positive and negative voltage values causes the aforementioned problem of the occurrence of disturbing chemical processes when a DC voltage is applied for a long time, i.e. if the same content is to be displayed for a long time. To achieve this, the same phase values must be written to the same modulator cells several times.

According to this invention, a globally constant phase offset is introduced between subsequently displayed frames for the entire modulator matrix, in order to overcome this problem. This phase offset is generated by the control unit, or is directly integrated into a computation, for example a hologram computation. The idea to use a phase offset is based on the finding that only the relative phase between individual modulator cells matters for the function as a phase-modulating light modulator in coherent-optical applications, but not the absolute phase of the individual cells.

Figure 4B:
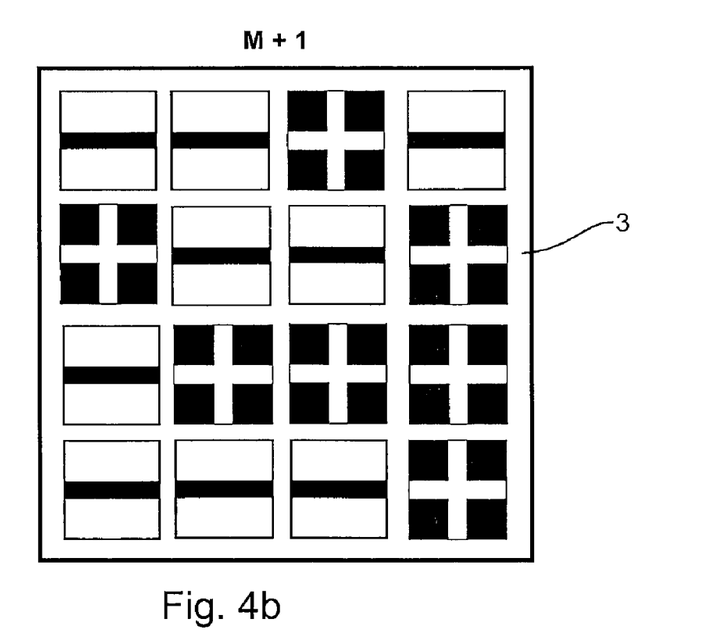

Applying a global offset of π to the above-mentioned numerical example (1) brings about the phase values for the exemplary SLM of 4×4 modulator cells which are shown in the numerical example (2) below:

| | | | |
|---|---|---|---|
| 1.7 π | 1.2 π | 0.3 π | 1.5 π |
| 0.1 π | 1.9 π | 1.8 π | 0.2 π |
| 1.5 π | 0.6 π | 0.7 π | 0.1 π |
| 0.5 π | 0.1 π | 0.4 π | 1.9 π |

As can be seen in FIG. 4b, the sign is inverted in each modulator cell. The control voltage for the left cell in the first row changed for example from 0.7π (positive voltage) in numerical example (1) to 1.7π (i.e. 2π−0.3π, negative voltage) in numerical example (2).

The global phase offset can be realised in different ways in the device for phase modulation. One possibility is to process the phase offset in the computing unit for generating the data to be written to the light modulator, e.g. during a hologram computation. An electric control voltage is calculated in the control unit for each modulator cell in the SLM to be controlled depending on the phase value to be written. A further possibility of realising a global phase offset is thus for the control unit to take into account the phase offset when calculating the control voltage in every other frame.

In contrast to conventional LCD for amplitude modulation, the mean voltage is not zero in two subsequent frames in the present phase-modulating light modulator. Applied to the example in the previous paragraph, this means for the first modulator cell in the top left corner of the table: The phase values of +0.7π in the first frame and −0.3π in the second frame with identical image content would correspond with a positive voltage $U_1$ and a negative voltage $-U_2$ with a lower absolute value $|-U_2|<|U_1|$.

The mean voltage, which is important for the general function, which is $0.5(U_1-U_2)$ in the example, is thereby significantly reduced compared to a DC voltage without phase offset ($U_1$ in this example).

In order to reduce the mean voltage to zero, the inverted phase values in the numerical examples (1) and (2) can be written to the modulator cells and the at least one light source can according to this invention be turned off for the duration of the writing process. The SLM will then only modulate light in every other frame. In the other frames, it is not illuminated by a light source. If the device is used as a display device for three-dimensional image representation, this three-dimensional image representation would only be generated in every other frame.

The top left modulator cell in the numerical example (1), to which the phase value of 0.7π was written with the voltage $U_1$ in the first frame, would be controlled with the voltage $-U_1$ in the next frame to obtain a phase value of 1.3π (2π−0.7π). By synchronising the control of the at least one light source and the modulator matrix, the light source would be turned on in the first frame, but turned off in the second one.

This embodiment boasts the advantage of reducing the mean voltage to zero. However, it is disadvantageous that the average lightness of a three-dimensional image representation is reduced to about 50% in a device with one or multiple light sources compared to the previously described embodiment.

The inventive design of the phase-modulating light modulator of a PSS liquid crystal type with λ/4 plates, which can for example have the physical form of birefringent films, and with the possibility of individual local selection of the sign of the voltage to be applied for each modulator cell and with a compensation of the DC voltage through a global phase offset provides an efficient phase-modulating SLM. Thanks to its short switching times, this SLM can preferably be used to display holographic reconstructions.

Another embodiment of the controllable device for phase modulation with PSS-type liquid crystals is realised in that it is modified for colour representation, as required for example in a holographic display device for colour reconstructions. The LC SLM must perform a phase modulation for at least three different colours, typically for the primary colours red, green and blue. These colours can for example be realised with three lasers with different, narrow emitted wavelength bands. However, this is associated with the problem that the layer thicknesses of the λ/4 and λ/2 plates are often optimised for one wavelength only.

Generally, this problem also occurs in amplitude-modulating LC displays. A conventional in-plane switching (IPS) display for example functions like a λ/2 plate with variable orientation of the optical axes of the molecules. A simple rotation of the molecules at a linear polarisation then only occurs for one wavelength. At the exit of the LC layer, light of other wavelengths shows an elliptic polarisation state. After leaving the linear polariser at the exit of the modulator cell (see FIG. 1), different wavelengths of the light have different amplitudes at the same voltage. In an amplitude-modulating display, this has the only disadvantage of a little lower luminous efficiency for the deviating wavelengths.

In a phase-modulating light modulator With the configuration λ/4–λ/2–λ/4 plate, the wavelength dependence would cause major problems. A mere phase modulation at constant amplitude can only be achieved for one wavelength. Undesired, coupled amplitude changes would occur together with the phase changes for the other wavelengths. The following actions and measures can be taken in order to minimise this effect.

First, means known from amplitude-modulating displays can generally be adapted to phase-modulating displays.

(a) A simple approach is to optimise the thickness d of the LC layer for the central wavelength, which corresponds to green light. The deviation of the optimum layer thickness of a $\lambda/2$ plate for the wavelengths of red and blue light then effects a minor phase-dependent amplitude change, which must be accepted.

(b) A LC material for displays is often a mix of several different substances, whose mixing ratio can affect parameters such as the birefringence. This is why such substances should be mixed for a phase-modulating light modulator whose dispersions preferably change with the wavelength, so that the relation $\Delta n(\lambda) \, d \approx \lambda/2$ does not only apply to one, but to multiple wavelengths.

(c) Further, a phase-modulating light modulator can be realised in that the LC layer of the $\lambda/4$ plates and/or that of the $\lambda/2$ plate is spatially structured such that the LC layers which locally modulate the light red, green and blue have a respective thickness d of the $\lambda/4$ plates or $\lambda/2$ plate which is adapted to the wavelength they modulate. Just like a conventional screen comprises red, green and blue colour pixels, which modulate only one colour and absorb the other colours with the help of spatially structured colour filters for each pixel or each modulator cell, $\lambda/4$ plates with different thicknesses can be used for the individual colour pixels.

Further, a phase modulation device can also be realised as follows:

(d) Solutions are known for $\lambda/4$ and $\lambda/2$ plates which can generally be used for manufacturing achromatic elements. Two different materials, e.g. a thin plate made of crystal quartz and a plate made of magnesium fluoride, can be combined such that the optical axes of the two materials are situated at right angles. The spectral dispersions of the birefringence of each plate extinguish each other in a certain wavelength range. Such achromatic elements can preferably be used for the static, non-controllable $\lambda/4$ plates of the inventive phase-modulating light modulator.

In order to realise a dynamic achromatic element, the two $\lambda/4$ plates must be turned actively. This means that two active layers must then be controlled, which is generally possible.

Further, there is a possibility to obtain achromatic $\lambda/4$ plates by combining three birefringent plates of the same material, whose optical axes are turned against each other by given angles.

(e) It is generally known that multi-order elements can be used for light modulation—but not in the context of phase displays. A multi-order element or multi-order diffractive optical element (DOE) can for example be a diffractive zone lens, which focuses light of multiple wavelengths. The relative optical paths in adjacent zones of the zone lens must only differ by a multiple of the wavelength if a continuous phase function is to be realised. For two or three different wavelengths, it is possible to satisfy this condition for several multiples of the individual wavelengths.

The above-mentioned equation for a $\lambda/2$ plate, $$\Delta n \, d = (2m+1)\lambda/2 \quad (1)$$

can be satisfied simultaneously for different orders $m_i$ (integer) and different wavelengths $\lambda_i$:

If there was no spectral dispersion of the birefringence, and if $\Delta n$ was constant for all wavelengths, the following equation would apply:

$$(2m_i+1)/(2m_j+1) = \lambda_j/\lambda_i \quad (2a)$$

It applies for example to the wavelengths of 465 nm, 537 nm and 635 nm, which lie in the blue, green and red spectrum of visible light, where m=5, 6, 7.

Considering the dispersion, the quoted wavelengths can be shifted somewhat. Then, the equation $$(2m_i+1)/(2m_j+1) = \lambda_j \Delta n(\lambda_i)/(\lambda_i \Delta n(\lambda_j)) \quad (2b)$$

must be satisfied.

Analogously, the following equations can be derived for a multi-order $\lambda/4$ plate without dispersion:

$$(4m+1)\ddot{e}/4 = \ddot{A}n \, d \quad (3)$$

$$(4m_i+1)/(4m_j+1) = \lambda_j/\lambda_i \quad (4a)$$

The wavelengths of 450 nm, 535 nm and 621 nm can thus be obtained.

Considering the dispersion, the following equation applies:

$$(4m_i+1)/(4m_j+1) = \lambda_j \Delta n(\lambda_i)/(\lambda_i \Delta n(\lambda_j)) \quad (4b)$$

The relations in these equations bring about the possibility that either one of the two equations (2b) or (4b) is satisfied by adapting the laser wavelengths $\lambda_i$ and $\lambda_j$ and by choosing the integer numbers $m_i$ and $m_j$ and, if applicable, by selecting a LC material with a suitable dispersion of the birefringence for these wavelengths $\Delta n \, (\lambda_i), \Delta n \, (\lambda_j)$.

Consequently, either the $\lambda/2$ plate or the two $\lambda/4$ plates can be made achromatic for the above found wavelengths by adapting the layer thickness d of those plates according to the equations (1) and (3).

Such elements of higher orders are generally more sensitive to deviations of wavelength and angle of incidence of the light. However, this does not have any adverse effects on a usage as a phase-modulating light modulator in a device for holographic representation of three-dimensional images, if defined, narrow-band light sources, such as lasers or special LEDs are used there. The SLM is then also illuminated with almost parallel coherent light.

As far as the controllable $\lambda/2$ plate is concerned, it must be considered that thicker layers d can have an effect on the switching delay and the given control voltage levels. The thickness d of the non-controllable $\lambda/4$ plates can be increased without causing any trouble.

As the equations (2b) and (4b) represent different conditions for the same parameters, which cannot be satisfied both at the same time, it follows that there is no set of three wavelengths where both the $\lambda/4$ condition (eq. 4b) and the $\lambda/2$ condition (eq. 2b) is fulfilled with one material. However, since different LC materials are used anyway for the non-controllable $\lambda/4$ plates and the controllable $\lambda/2$ plate, materials with a dispersion of the birefringence $\Delta n(\lambda)$ can be chosen such that there are common wavelengths, so that the materials can be used to realise both $\lambda/4$ plates and $\lambda/2$ plates as multi-order elements.

(f) The controllable device for phase modulation described in the first embodiment comprises two $\lambda/4$ plates and one $\lambda/2$ plate. The optical axes of the two $\lambda/4$ plates can be arranged either parallel to each other or at right angles. If the layer thickness d is optimal, a mere phase modulation is effected in either case, but the relative polarisation at the exit of the phase-modulating light modulator is different. Since both arrangements differ in their wavelength dependence, the configuration with the smaller deviations from the given phase modulation as regards the used wavelengths will be chosen as the preferred physical form of the LC modulator matrix.

The invention claimed is:

1. Controllable device for phase modulation of coherent light with a spatial light modulator which comprises a modulator matrix with a regular arrangement of controllable liquid crystal modulator cells, with at least one light source which illuminates the modulator matrix, and with a control unit which controls the phase modulation in the liquid crystal modulator cells, for realising a three-dimensional image representation, Where the controllable liquid crystal modulator cells have a layer with the functionality of a controllable λ/2 plate with liquid crystal molecules of the type and arrangement of polarization shielded smectic liquid crystal cells, said layer being disposed between two layers with the functionality of non-controllable λ/4 plates, Where each liquid crystal modulator cell can be controlled locally by the control unit with an individual positive or negative voltage value, depending on the positive or negative sign of a phase value to be written, Where the control unit is programmed such to generate a globally constant phase offset for the phase values to be written to the liquid crystal modulator cells, and Where the globally constant phase offset is generated in every other frame.

2. Device according to claim 1, where the global phase offset is generated simultaneously for all liquid crystal modulator cells.

3. Device according to claim 1, where the global phase offset is generated as an equivalent to a frame inversion.

4. Device according to claim 1, where the phase value of the global phase offset depends on the modulation range of the modulator matrix.

5. Device according to claim 4, where the phase value of the global phase offset is π or a modulation range of 2π.

6. Device according to claim 1, where a local phase offset can be generated in the liquid crystal modulator cells while the electric field is turned off by aligning the molecule axes of the liquid crystal molecules parallel with the optical axes of the λ/4 layers.

7. Device according to claim 1, where the phase value which results from a given voltage can be realised in a liquid crystal modulator cell with same absolute value but opposite sign when the voltage polarity is reversed.

8. Device according to claim 1, where the at least one light source is designed to provide polarised light.

9. Device according to claim 1, where the modulator matrix comprises a polariser at least on the entry side.

10. Device according to claim 9 with at least one circular polariser, which combines the functionality of a λ/4 plate and a linear polariser.

11. Device according to claim 1, where for colour representation the modulator matrix has such a configuration of the λ/4 plates and/or λ/2 plate that a phase modulation can be controlled by the control unit for at least three different colours or wavelengths.

12. Device according to claim 11, where the λ/2 plate has a thickness d of the liquid crystal layer which is optimised for a central one of the at least three wavelengths used for modulation.

13. Device according to claim 11, where the liquid crystal modulator cells comprise a mix of liquid crystal materials whose dispersion changes with the wavelength, so that $\Delta n(\lambda) \approx \lambda/2$ applies for the different wavelengths of the at least three colours.

14. Device according to claim 11, where the λ/4 plates and/or the λ/2 plate show a different layer thickness d and/or orientation of their optical axes for the liquid crystal modulator cells which correspond with the different wavelengths.

15. Device according to claim 11, where the non-controllable λ/4 plates are achromatic elements.

16. Device according to claim 11, where the non-controllable λ/4 plates and/or the λ/2 plate are multi-order elements which are designed such that there is a set of wavelengths $\lambda i$ and a set of integer numbers mi which satisfy the equation $\Delta n(\lambda i)d=(2mi+1)\lambda i/2$ for the λ/2 plate and/or the equation $\Delta n(\lambda i)d=(4mi+3)\lambda i/2$ for the λ/4 plate, for all $i$=1, 2, 3, . . . at least approximately.

* * * * *